(No Model.) 2 Sheets—Sheet 1.

J. MANNING.
METHOD OF COLLECTING AND CONVEYING WATER.

No. 599,719. Patented Mar. 1, 1898.

WITNESSES:
Harry L. Rohrer
W. A. Redmond

INVENTOR
James Manning
BY
J. F. Beale.
ATTORNEY.

(No Model.) 2 Sheets—Sheet 2.

J. MANNING.
METHOD OF COLLECTING AND CONVEYING WATER.

No. 599,719. Patented Mar. 1, 1898.

WITNESSES:
Harry L. Rohrer
W. A. Redmond

INVENTOR
James Manning
BY
J. F. Beale
ATTORNEY.

UNITED STATES PATENT OFFICE.

JAMES MANNING, OF WATER VALLEY, TEXAS.

METHOD OF COLLECTING AND CONVEYING WATER.

SPECIFICATION forming part of Letters Patent No. 599,719, dated March 1, 1898.

Application filed April 28, 1897. Serial No. 634,283. (No model.)

*To all whom it may concern:*

Be it known that I, JAMES MANNING, a citizen of the United States, residing at Water Valley, in the county of Tom Green and State of Texas, have invented a certain new and useful Method of Collecting and Conveying Water; and I do hereby declare the following to be a full, clear, and exact description of the invention, such as will enable others skilled in the art to which it appertains to make and use the same.

It is well known that at certain depths beneath the earth's surface condensation of the moisture in the earth invariably takes place. The line of invariable condensation, like the temperature of the earth below the surface, varies in different localities, depending upon the formation of the soil, rainfall, and climate. Now the object of my invention is to provide means for promoting this condensation of the earth's moisture and to collect by capillary attraction the moisture of the surrounding earth to said means, and after precipitating the same to collect and conduct the water thus formed to a reservoir provided for that purpose.

It is also my object by like means to collect and condense the surrounding moisture of the earth and make it available for subterranean irrigation.

It is also my object by like means to form a drainage system for boggy land or fields.

In the accompanying drawings I have shown my invention applied to meet different conditions.

Figure 1:
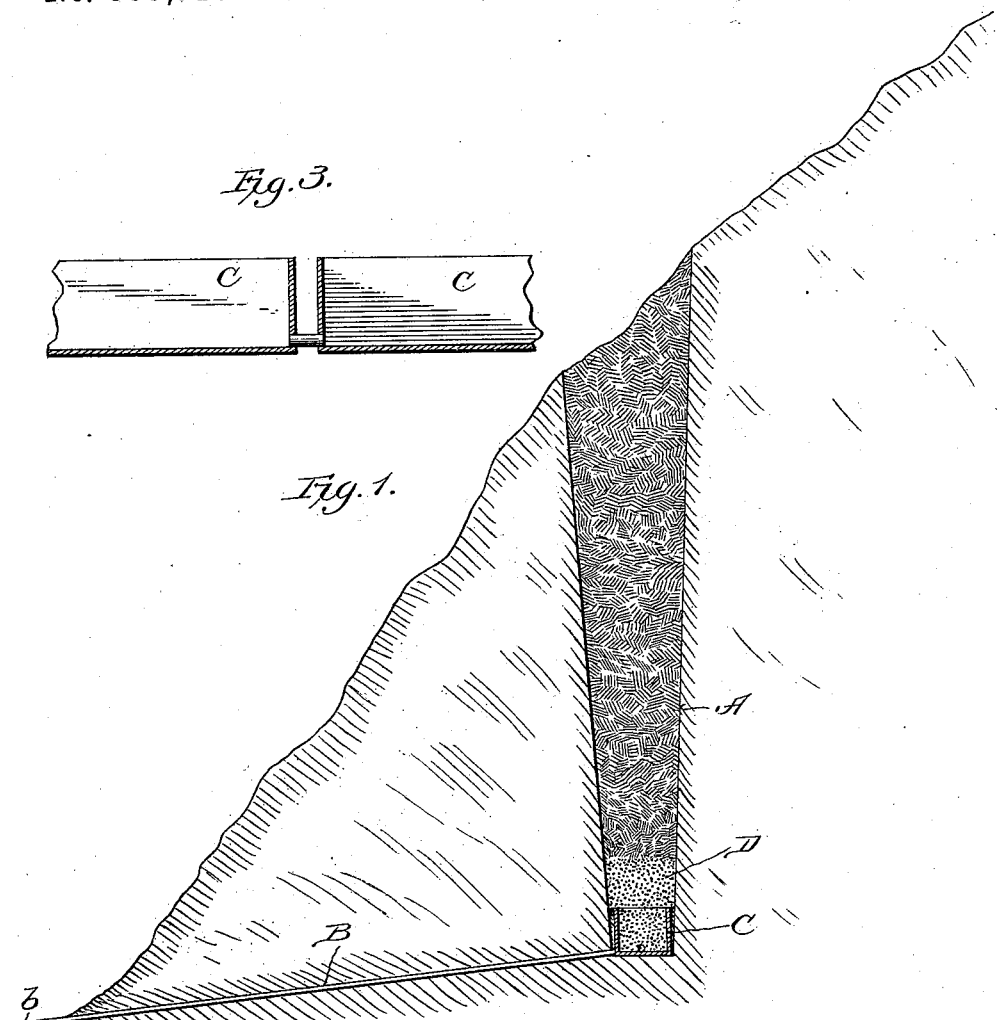

Figure 1 is a sectional view taken through the side of a hill, showing in section a trench A near the foot of the hill, which partly encircles it. This trench may be of various lengths, depending upon the amount of water required and the condition of the soil. For ordinary conditions of the soil I make the trench about thirty-five feet long, nine feet deep, and two feet wide at the top and about one foot at the bottom. It should have a fall of several feet, and at its lower end is met by a trench running at about right angles thereto and down the hill. In the bottom of this trench I place a two-inch pipe B, which comes out at the surface, as at *b*, say, about twenty feet distant.

Figure 5:
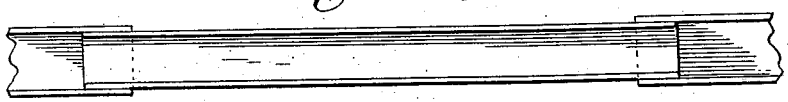

C denotes a trough placed in the bottom of trench A, open at the top and containing fine gravel D, which is filled in the trough and ditch until it is heaped up a foot above the rim of the trough, the soft earth being first packed tightly between the sides of the trough and the walls of the ditch. The trough should be about ten inches deep and of the same width and extend throughout the length of ditch. The pipe B is connected through the side of this trough near its lower end. Said trough may be made of wood in sections of about eighteen feet and the sections joined at their bottoms by short three-inch pipes, as shown in Fig. 3. Figs. 4 and 5 show modifications of the form of trough whereby I dispense with the use of said three-inch pipe. It will be seen that the gravel comes in contact with the sides of the ditch for a foot above the trough. On top of this gravel about six or eight inches of soil is thrown and well packed down. Both ditches are then filled in level with the surface and nothing is visible but the mouth of the two-inch pipe where it appears above the surface.

When the ditch and trough containing the gravel are placed in a desirable location, condensation of the moisture takes place in the gravel, which is the condenser, and as the water accumulates it forms into drops, which by gravity find their way through the interstices or cavities formed by the gravel to the bottom of the trough, where it collects and flows through into the pipe B and to the surface. A favorable location to produce this result is where the soil at the depth of a few feet is moist and the soil of such a formation as to preclude evaporation at the surface. More or less condensation naturally takes place in the surrounding soil, and by bringing the gravel in contact with the sides of the ditch and by the soil thrown on top capillaries are formed with the surrounding soil, which absorb the water resultant from such condensation and conduct it into the trough, whether it be free or capillary water coming within the influence of such capillaries.

The material used for condensing the moisture and conducting the water into the trough must form capillaries somewhat larger than those in the surrounding soil, as they will offer less resistance to the flow of water. When there is comparatively little water or moisture and very compact soil, fine sand will answer best. It will be understood that the water coming in contact with the capillary of the fine gravel is siphoned out of the soil into the bottom of the trough, and if the capillary of the gravel is of such altitude as to preclude the water being drawn back again it will be carried to the trough and pass off through the pipe B. Therefore in constructing the condenser the trough should be of greater depth than the altitude of the capillary formed by the cavities of whatever material the condenser is composed of.

Figure 2:
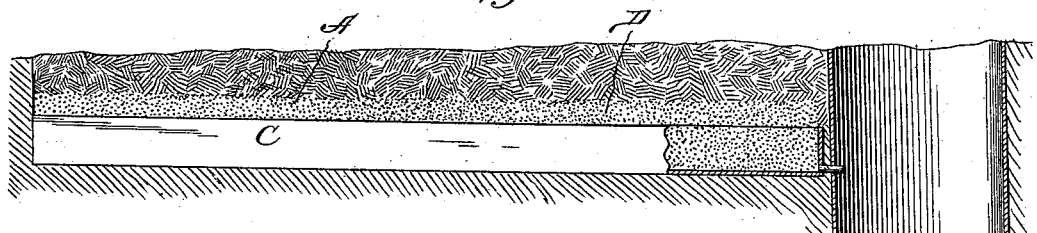

In Fig. 2 I show the application of my invention to a valley or field having a comparatively level surface. In this instance the trench and condenser are constructed in the same manner and the tangent ditch omitted, instead of which latter a basin or well is dug six feet below the lower end of the ditch A, and a short piece of two-inch pipe is used to conduct water from the trough to the basin, from which it may be pumped to the surface. The trench A is given a gradual slope toward the basin, which latter should be water-tight.

Figure 6:
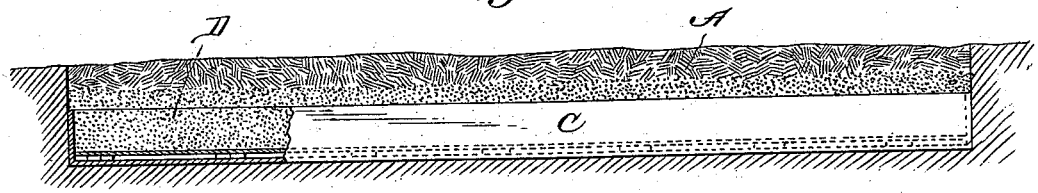
Figure 7:
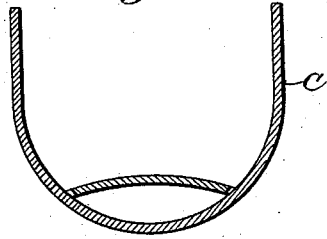
Figure 8:
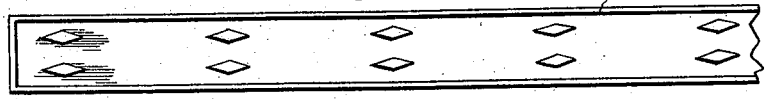

In Fig. 6 I show the application of my invention to subterranean irrigation adapted for irrigating the roots of plants or trees. In this instance the bottom of the ditch is made level and the depth of the ditch about five feet. The trough and gravel is arranged as before mentioned, but with no outlet to the trough. The trough may be constructed with a false bottom, as shown in Figs. 6, 7, and 8, Figs. 6 and 8 showing a wooden trough having cleats nailed to the bottom and a board placed on top of them, leaving a narrow space between the sides of the board and trough, so that the gravel cannot pass through. Fig. 7 shows a form of semicircular terra-cotta trough having a false bottom formed of an arc-shaped piece of terra-cotta having fluted edges, which allows the water to percolate through the bottom of the trough. The design of this condenser and trough is to absorb and condense the moisture and the water is collected in the bottom of the trough. The capillary is so arranged that there will always be a few inches of water in the trough which cannot be taken up by capillary attraction. This reserve water will by evaporation and condensation in the surrounding soil irrigate the roots of plants and trees.

It is evident that my invention is equally well adapted for draining boggy land, and in this instance the form of trough shown in Fig. 7, having a false bottom, is best adapted to convey the water to a suitable outlet, a sufficient fall being given to the trough. Where false bottoms are used, the altitude of the capillary attraction will be estimated from the top of the false bottom and not from the bottom of the trough, as heretofore.

Where fine sand is used as a condensing and siphoning material, a layer of gravel an inch deep may be first filled in, thereby forming a strainer to the fine material, which prevents it from being washed through the openings upon the sides of the false bottom. Thin flat rocks of small size can be used by placing them close together and placing above them a like layer of larger rocks, which break joints with the under layer.

I have specified gravel and sand, but other materials forming cavities and capillaries will answer for draining moisture from soil. Any material having cavities that will take up moisture will to a certain degree answer the purposes of a condenser; but the best is that material which will afford the greatest contrast in temperature to the surrounding moisture.

Having shown and described my invention, what I claim, and desire to secure by Letters Patent, is—

1. The structure herein described for collecting water consisting essentially of a trench intersecting the invariable moisture-line of the earth, the same being provided with a waterproof trough open at the top and the trough and a portion of the trench being filled with a material forming cavities and capillaries to a greater height than the altitude of the capillary attraction of said material in the trough, and the trench being filled with soil level with the surface.

2. The structure herein described for collecting and conveying water consisting of a trench intersecting the invariable moisture-line of the earth, the same being provided with a waterproof trough open at the top, provided with a false bottom, and the trough and a portion of the trench being filled with a material forming cavities and capillaries to a greater height than the altitude of the capillary attraction of said material in the trough, and the trench being filled with soil level with the surface.

In testimony whereof I affix my signature in presence of two witnesses.

JAS. MANNING.

Witnesses:
 J. REASANOVER,
 W. O. REASANOVER.